(12) United States Patent
Yendluri

(10) Patent No.: US 10,467,576 B2
(45) Date of Patent: Nov. 5, 2019

(54) DISTRIBUTED SOFTWARE PROCESS TRACKING

(75) Inventor: Prasad Yendluri, San Jose, CA (US)

(73) Assignee: SOFTWARE AG USA, INC., Reston, VA (US)

(*) Notice: Subject to any disclaimer, the term of this patent is extended or adjusted under 35 U.S.C. 154(b) by 1338 days.

(21) Appl. No.: 12/073,642

(22) Filed: Mar. 7, 2008

(65) Prior Publication Data
US 2009/0228546 A1 Sep. 10, 2009

(51) Int. Cl.
| G06Q 10/08 | (2012.01) |
| G06Q 30/06 | (2012.01) |
| G06Q 10/06 | (2012.01) |
| G06Q 10/10 | (2012.01) |

(52) U.S. Cl.
CPC ............ *G06Q 10/08* (2013.01); *G06Q 10/06* (2013.01); *G06Q 10/10* (2013.01); *G06Q 30/06* (2013.01)

(58) Field of Classification Search
CPC ........ G06Q 10/08; G06Q 30/06; G06Q 10/06; G06Q 10/10
USPC ............................................ 705/1.1; 709/203
See application file for complete search history.

(56) References Cited

U.S. PATENT DOCUMENTS

| 5,958,010 A * | 9/1999 | Agarwal et al. ............. 709/224 |
| 6,356,950 B1 | 3/2002 | Tillmann et al. |
| 7,028,052 B2 * | 4/2006 | Chapman et al. |
| 7,664,828 B2 | 2/2010 | Schlimmer et al. |
| 2001/0055317 A1 | 12/2001 | Kajizaki et al. |
| 2002/0038228 A1 * | 3/2002 | Waldorf et al. .................. 705/7 |
| 2002/0101872 A1 | 8/2002 | Boivie |
| 2004/0039964 A1 | 2/2004 | Russell et al. |
| 2004/0162873 A1 | 8/2004 | Kojima et al. |
| 2004/0233933 A1 | 11/2004 | Munguia |
| 2005/0015472 A1 | 1/2005 | Catania et al. |
| 2005/0018670 A1 | 1/2005 | Shigematsu et al. |
| 2005/0188072 A1 | 8/2005 | Lee et al. |
| 2005/0203949 A1 * | 9/2005 | Cabrera et al. ........... 707/103 R |
| 2006/0075465 A1 | 4/2006 | Ramanathan et al. |
| 2006/0075466 A1 | 4/2006 | Ramanathan et al. |
| 2006/0077981 A1 | 4/2006 | Rogers |
| 2006/0200526 A1 | 9/2006 | Cina |
| 2007/0174815 A1 | 7/2007 | Chrysanthakopoulos et al. |

(Continued)

FOREIGN PATENT DOCUMENTS

WO WO-0072532 11/2000

OTHER PUBLICATIONS

European Search Report for EP Application No. 08005491.9 dated Aug. 6, 2008.

*Primary Examiner* — Lynda Jasmin
*Assistant Examiner* — Ehrin L Pratt
(74) *Attorney, Agent, or Firm* — Nixon & Vanderhye P.C.

(57) ABSTRACT

A system for distributed business process tracking includes a client adapted to receive a first notification and a second notification, a first provider adapted to perform a distributed business process using a first process, generate a first notification based on the first process, and send the first notification to the client, a second provider adapted to perform a distributed business process using a second process, generate a second notification based on the second process, and send the second notification to the client, and wherein the first provider sends the first notification to the client independently of the second provider or the first provider sends the first notification to the client using the second provider.

15 Claims, 12 Drawing Sheets

(56) References Cited

U.S. PATENT DOCUMENTS

| | | |
|---|---|---|
| 2007/0226356 A1 | 9/2007 | Levin et al. |
| 2008/0046335 A1 | 2/2008 | Zhou |
| 2008/0177872 A1* | 7/2008 | Vengroff ................. 709/223 |
| 2008/0228860 A1 | 9/2008 | Angelov |
| 2008/0244692 A1 | 10/2008 | Chang |
| 2008/0244693 A1 | 10/2008 | Chang |
| 2008/0301755 A1 | 12/2008 | Sinha et al. |
| 2009/0064324 A1* | 3/2009 | Hunt et al. ................. 726/22 |
| 2009/0150969 A1 | 6/2009 | Davis et al. |

* cited by examiner

```
<s:Envelope ...>
 <s:Header ...>
  <wsa:Action>
  http://www.SoftwareAG.com/ws/2008/wspt/GetAvailProcessTypes/Request
  </wsa:Action>
  <wsa:MessageID>xs:anyURI</wsa:MessageID>
  <wsa:ReplyTo>endpoint reference</wsa:ReplyTo>
  <wsa:To>xs:anyURI</wsa:To>
  ...
 </s:Header>
 <s:Body/>
</s:Envelope>
```

FIG. 4A

```
<wspt:ProcessTrackingNotification>
  [ <wspt:BatchNotification>
      <wspt:StartTime>xs:dateTime</wspt:StartTime>
      <wspt:EndTime>xs:dateTime</wspt:EndTime>
    <wspt:BatchNotification> ]?
  [ <wspt:Notification>
      <wspt:ProcessType>
        <wspt:ProcessName>xs:NCName</wspt:ProcessName>
        <wspt:Namespace>xs:anyURI</wspt:Namespace>
      </wspt:ProcessType>
      [<wspt:ProcessInfo>
        <wspt:InstanceID>xs:string<wspt:InstanceID>
        [ <wspt:Event>
            <wspt:TimeStamp>xs:dateTime</wspt:TimeStamp>
            <wspt:EventType>xs:string</wspt:EventType>
            [<wspt:ProcessLevelEvent>xs:string</wspt:ProcessLevelEvent>
             |
             <wspt:ProcessStepEvent Type=xs:string >
               <wspt:ActivityName>xs:NCName</wspt:ActivityName>
               <wspt:ActivityParams>xs:Any</wspt:ActivityParams>?
             </wspt:ProcessStepEvent>
             |
             <wspt:TransitionEvent TransitionType=xs:string>
               <wspt:FromActivity>xs:NCName<wspt:FromActivity>
               <wspt:ToActivity>xs:NCName<wspt:ToActivity>
             </wspt:TransitionEvent>]
        </wspt:Event> ]*
      </wspt:ProcessInfo>]*
  </wspt:Notification> ]*
</wspt:ProcessTrackingNotification>
```

FIG. 4B

```
<s:Envelope ...>
 <s:Header ...>
  <wsa:Action>
  http://www.SoftwareAG.com/ws/2008/wspt/GetAvailProcessTypes/Response
  </wsa:Action>
  <wsa:RelatesTo>xs:anyURI</wsa:RelatesTo>
  <wsa:To>xs:anyURI</wsa:To>
  ...
 </s:Header>
 <s:Body ...>
  <wspt:ProcessTypeList ...>
   [<wspt:ProcessType langID=xs:anyURI?>
      <wspt:ProcessName>xs:NCName</wspt:ProcessName>
           <wspt:Namespace>xs:anyURI</wspt:Namespace>
   </wspt:ProcessType>]*
  </wspt:ProcessTypeList>
 </s:Body>
</s:Envelope>
```

FIG. 4C

```
<s:Envelope ...>
 <s:Header ...>
  <wsa:Action>
   http://www.SoftwareAG.com/ws/2008/wspt/GetSubsEndpoint/Request
  </wsa:Action>
  <wsa:MessageID>xs:anyURI</wsa:MessageID>
  <wsa:ReplyTo>endpoint reference</wsa:ReplyTo>
  <wsa:To>xs:anyURI</wsa:To>
  ...
 </s:Header>
 <s:Body>
   <wspt:GetSubsEndpoint>
    [<wspt:ProcessType langID=xs:anyURI?>
     <wspt:ProcessName>xs:NCName</wspt:ProcessName>
     <wspt:Namespace>xs:anyURI</wspt:Namespace>
    </wspt:ProcessType>]?
    <wspt:Granularity>xs:string</wspt:Granularity>?
    <wspt:BatchNotifyPeriod>xs:integer</wspt:BatchNotifyPeriod>?
   </wspt:GetSubsEndpoint>
 </s:Body>
</s:Envelope>
```

FIG. 4D

```
<s:Envelope ...>
 <s:Header ...>
  <wsa:Action>
    http://www.SoftwareAG.com/ws/2008/wspt/GetSubsEndpoint/Response
  </wsa:Action>
  <wsa:RelatesTo>xs:anyURI</wsa:RelatesTo>
  <wsa:To>xs:anyURI</wsa:To>
  ...
 </s:Header>
 <s:Body>
  <wspt:SubscriptionEndPoint ...>
    <wspt:Expires>xs:dateTime<wspt:Expires>?
    <wspt:Granularity>xs:string</wspt:Granularity>?
    <wspt:BatchNotifyPeriod>xs:integer</wspt:BatchNotifyPeriod>?
    <wsa:EndpointReference>
       ... ...
    </wsa:EndpointReference>
   </wspt:SubscriptionEndPoint>
 </s:Body>
</s:Envelope>
```

FIG. 4E

```
<s:Envelope ...>
 <s:Header ...>
  <wsa:Action>
    http://www.SoftwareAG.com/ws/2008/wspt/GetProcessLog/Request
  </wsa:Action>
  <wsa:MessageID>xs:anyURI</wsa:MessageID>
  <wsa:ReplyTo>endpoint reference</wsa:ReplyTo>
  <wsa:To>xs:anyURI</wsa:To>
  ...
 </s:Header>
 <s:Body>
  <wspt:GetProcessLog ...>
   <wspt:ProcessType langID=xs:anyURI?>
     <wspt:ProcessName>xs:NCName</wspt:ProcessName>
     <wspt:Namespace>xs:anyURI</wspt:Namespace>
   </wspt:ProcessType>?
   <wspt:TimeWindow>
     <wspt:StartTime>xs:dateTime</wspt:StartTime>
     <wspt:EndTime>xs:dateTime</wspt:EndTime>
   </wspt:TimeWindow>
   <wspt:Granularity>xs:string</wspt:Granularity>?
  </wspt:GetProcessLog>
 </s:Body>
</s:Envelope>
```

FIG. 4F

```
<s:Body ...>
  <wspt:ProcessLog ...>
    <wspt:ProcessType langID=xs:anyURI>
        <wspt:ProcessName>xs:NCName</wspt:ProcessName>
        <wspt:Namespace>xs:anyURI</wspt:Namespace>
    </wspt:ProcessType>
    <wspt:TimeWindow>
        <wspt:StartTime>xs:dateTime</wspt:StartTime>
        <wspt:EndTime>xs:dateTime</wspt:EndTime>
    </wspt:TimeWindow>
 [<wspt:ProcessInfo>
    <wspt:InstanceID>xs:string<wspt:InstanceID>
     [ <wspt:Event>
        <wspt:TimeStamp>xs:dateTime</wspt:TimeStamp>
        <wspt:EventType>xs:string</wspt:EventType>
       [<wspt:ProcessLevelEvent>xs:string</wspt:ProcessLevelEvent>
              |
        <wspt:ProcessStepEvent Type=xs:string >
          <wspt:ActivityName>xs:NCName</wspt:ActivityName>
          <wspt:ActivityParams>xs:Any</wspt:ActivityParams>?
        </wspt:ProcessStepEvent>
              |
        <wspt:TransitionEvent TransitionType=xs:string>
          <wspt:FromActivity>xs:NCName<wspt:FromActivity>
          <wspt:ToActivity>xs:NCName<wspt:ToActivity>
        </wspt:TransitionEvent>]
     </wspt:Event>]*
  </wspt:ProcessInfo>]*
 </wspt:ProcessLog>
</s:Body>
```

FIG. 4G

```
<s:Envelope ...>
 <s:Header ...>
  <wsa:Action>http://docs.oasis-open.org/wsn/2004/06/WS-BaseNotification/Subscribe</wsa:Action>
  <wsa:RelatesTo>xs:anyURI</wsa:RelatesTo>
  <wsa:To>xs:anyURI</wsa:To>
  ...
 </s:Header>
 <s:Body>
  <wsnt:Subscribe>
    <wsnt:ConsumerReference>
       wsa:endpointReference
    </wsnt:ConsumerReference>
    <wsnt:TopicExpression Dialect = "xs:anyURI">
       {any}
    </wsnt:TopicExpression>
    <wsnt:UseNotify>true</wsnt:UseNotify>?
    <wsnt:Precondition>wsrp:QueryExpression</Precondition>?
    <wsnt:Selector>wsrp:QueryExpression</wsnt:Selector>?
    <wsnt:InitialTerminationTime>
       xs:dateTime
    </wsnt:InitialTerminationTime>?
  </wsnt:Subscribe>
 </s:Body>
</s:Envelope>
```

FIG. 4H

```
<s:Envelope ...>
 <s:Header ...>
  <wsa:Action>
http://docs.oasis-open.org/wsn/2004/06/WS-BaseNotification/SubscribeResponse
  </wsa:Action>
  <wsa:RelatesTo>xs:anyURI</wsa:RelatesTo>
  <wsa:To>xs:anyURI</wsa:To>
  ...
 </s:Header>
 <s:Body>
  <wsnt:SubscribeResponse>
    <wsnt:SubscriptionReference>
      <wsa:Address> Address of Subscription Manager </wsa:Address>
      <wsa: ReferenceParameters>
        Subscription Identifier
      </wsa: ReferenceParameters>
    </wsnt:SubscriptionReference>
  </wsnt:SubscribeResponse>
 </s:Body>
</s:Envelope>
```

FIG. 4I

```
<s:Envelope xmlns:wspt='http://www.SoftwareAG.com/ws/2008/wspt' ...>
 <s:Header>
  <wsa:Action>
    http://docs.oasis-open.org/wsn/2004/06/WS-BaseNotification/Notify
  </wsa:Action>
  <wsa:To> ... </wsa:To>
   ...
 </s:Header>
 <s:Body>
  <wsnt:Notify>
   <wsnt:NotificationMessage>
    <wsnt:Topic Dialect= "http://docs.oasis-open.org/wsn/t-1/TopicExpression/Simple">
     wspt:ProcessTracking
    </wsnt:Topic>
    <wsnt:ProducerReference ... >
      <wsa:Address>
        Producer Endpoint
      </wsa:Address>
      <wsa:ReferenceParameters>
        .....
      </wsa:ReferenceParameters>
    </wsnt:ProducerReference>
    <wsnt:Message>
     <wspt:ProcessTrackingNotification>
        ...
     </wspt:ProcessTrackingNotification>
    </wsnt:Message>
   <wsnt:NotificationMessage>
  </wsnt:Notify>
 </s:Body>
</s:Envelope>
```

FIG. 4J

DISTRIBUTED SOFTWARE PROCESS TRACKING

CROSS REFERENCE TO THE RELATED APPLICATIONS

This application is related to co-pending U.S. patent application Ser. No. 12/073,647 entitled "System and Method for Bulk Even Transfer", and Ser. No. 12/073,662 entitled "Policy Negotiation System and Method", each filed on a date even herewith and each of which is incorporated herein by reference.

BACKGROUND

Distributed business processes, such as purchase orders, bill payments, resource allocation requests, etc., may span multiple orchestration environments and process engines belonging to multiple parties connected by a network such as, for example, the Internet. The multiple orchestration environments and process engines may be spread across multiple enterprises, or be within the boundaries of a single enterprise, and may include heterogeneous computer systems. For example, a buyer may attempt to purchase an item from a seller. The buyer's computer system may initiate the purchase order by contacting the seller's computer system. The seller may need to make a request to a bank's computer system to verify that the buyer can pay for the item and to a warehouse's computer system to determine whether the item is available in inventory. During this process, the buyer's computer system may only receive notifications from the seller's computer system indicating either the successes or failure of the distinct parts of the process, i.e., whether or not the buyer's ability to pay for the item has been verified, and whether or not the item is available. If the distributed business process for the purchase fails because, for example, the seller's computer system never successfully sends a request to the bank's computer system, the buyer may only be notified that the process has failed, and not of the reason for the failure. The buyer may not be able to track the portions of the distributed business process that take place on systems other than the seller's computer system, and may only receive minimal information on the progress of portions of the distributed business process that are performed on the seller's computer system.

SUMMARY

One embodiment includes a computer-readable medium comprising instructions, which when executed by a computer system causes the computer system to perform operations for distributed business process tracking, the computer-readable medium including instructions for sending to a client a list comprising a plurality of processes available for tracking, instructions for receiving from the client a selected process from the plurality of processes available for tracking, instructions for sending to the client an end point reference for the selected process, instructions for receiving from the client a subscription request for the selected process at the end point reference, instructions for sending to the client a confirmation of receipt of the subscription request for the selected process, and instructions for sending to the client a notification for the selected process, wherein the notification is based on communication with another computer system.

One embodiment includes a computer-readable medium comprising instructions, which when executed by a computer system causes the computer system to perform operations for distributed business process tracking, the computer-readable medium including instructions for receiving from a provider a list comprising a plurality of processes available for tracking, instructions for selecting a process from the plurality of processes available for tracking to obtain a selected process, instructions for sending to the provider the selected process, instructions for receiving from the provider an end point reference based on the selected process, instructions for sending to the provider at the end point reference a request for a subscription for the selected process, instructions for receiving from the provider a confirmation of receipt of the subscription request for the selected process, instructions for receiving from the provider a notification for the selected process, wherein the notification is based on communication between the provider and another computer system, instructions for correlating the notification for the selected process with the status of the selected process, wherein the status of the selected business process is updated based on the notification, and instructions for tracking a distributed business process based on the status of the selected process.

One embodiment includes a system for distributed business process tracking, including a process definition repository including a process available for tracking, a process log including a log entry, and a Web-Service-Process Tracking Web Service adapted to generate a list of processes available for tracking from the process definition repository, send the list of processes available for tracking to a client, receive a selection of a process to track from the client, send end point references based on the selection of the process to track to the client, and including a subscription manager adapted to receive a subscription request for the process to track from the client at the end point reference, send a confirmation of receipt of the subscription request to the client, and set up a subscription based on the subscription request on a notification manager, and the notification manager adapted to determine if the log entry in the process log is for the process to track based on the subscription, and if the log entry in the process log is for the process to track, collect the log entry from the process log, generate a notification based on the log entry, and send the log entry to the client.

One embodiment includes a system for distributed business process tracking including a client adapted to receive a first notification and a second notification, a first provider adapted to perform a distributed business process using a first process, generate a first notification based on the first process, and send the first notification to the client, a second provider adapted to perform a distributed business process using a second process, generate a second notification based on the second process, and send the second notification to the client, and wherein the first provider sends the first notification to the client independently of the second provider or the first provider sends the first notification to the client using the second provider.

Further features of the invention, as well as the structure and operation of various embodiments of the invention, are described in detail below with reference to the accompanying drawings.

BRIEF DESCRIPTION OF THE DRAWINGS

Embodiments will now be described in connection with the associated drawings, in which:

FIGS. 4A-4J depict exemplary message syntaxes for distributed business process tracking.

DETAILED DESCRIPTION OF THE EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

Figure 1:
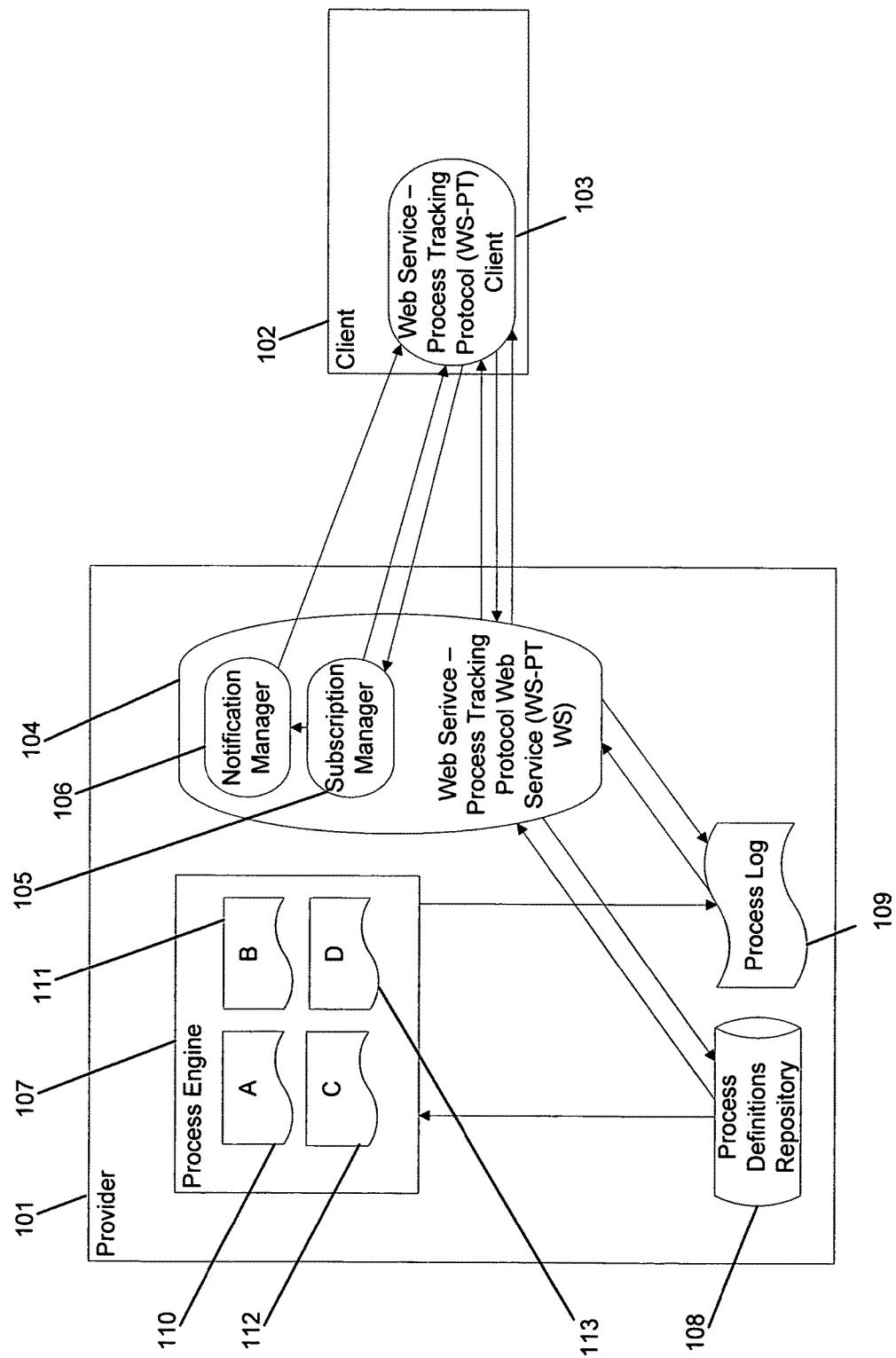
FIG. 1 depicts an exemplary system for distributed business process tracking.

FIG. 1 depicts an exemplary system for distributed business process tracking. A client 102 may initiate a distributed business process with any number of computer systems, each of which may be a provider 101. The following process will be described with respect to one provider 101, and one client, 102 although there may be more than one provider 101 involved in the distributed business process. The client 102 may interact with each provider 101 in the same manner. The provider 101 and the client 102 may be heterogeneous computer systems, utilizing different hardware and software platforms and configurations. The provider 101 may send the client 102 a list of processes available. A process may be a software based computer program, or some component thereof, that may perform a task required for the completion of the distributed business process. The client 102 may examine the list of processes available and send the provider 101 a request for the end point references for the processes for which the client 102 wishes to receive process tracking notifications (notifications). The end point references may be addresses and/or information describing to the client 102 how to subscribe to notifications for processes. The provider 101 may send the requested end point references for the processes to the client 101. The client 102 may use the end point references for the processes to send a subscription request for notifications for the processes to the provider 101. The provider 101 may send a confirmation of the subscription requests to the client 102. As the business process is performed by the provider 101, notifications for the processes subscribed to by the client 102 may be generated by the provider 101 and sent to the client 102. The client 102 may correlate the notifications to the business process, which may allow the client 102 to track the status and progress of the business process using the notifications.

The provider 101 may be any computer system that may be used for performing business processes. The provider 101 may be connected to a network, and may receive requests for the performance of distributed business processes from any other computer system connected to the network.

The client 102 may be any computer system that may initiate a distributed business process by requesting the performance of the distributed business process by the provider 101. The client 102 may be connected to the same network as the provider 101, and may send requests for the performance of distributed business processes to the provider 101 over the network. The client 102 may track the distributed business process as it is performed using notifications from the provider 101.

The client 102 may include a module for handling communication between the client 102 and the provider 101. An example of this module may be a Web Service-Process Tracking (WS-PT) Client 103. The WS-PT Client 103 may be any combination of hardware and software suitable for handling communications between the client 102 and the provider 101 during the tracking of a distributed business process, and for processing notifications received from the provider 101 to track the distributed business process. For example, the WS-PT Client 103 may be a software component running on the client 101, or specialized hardware connected to the client 101. The provider 102 may include a corresponding module for communicating with client such as the client 101. An example of this module may be a Web Service-Process Tracking Protocol Web Service 104. The WS-PT Client 103 and WS-PT Web Service 104 may use a WS-PT protocol in communicating with each other. The WS-PT protocol may be any suitable communications protocol for facilitating communications between a web service and a client of the web service and may be platform independent. For example, the WS-PT protocol may be a Simple Object Access Protocol (SOAP) based protocol.

FIGS. 4A and 4B depict exemplary message syntaxes for a WS-PT protocol for distributed business process tracking. FIGS. 4C-4J depict other exemplary message syntaxes for distributed business process tracking. The exemplary message syntax depicted in FIG. 4A may be for a request for the list of processes available sent from the WS-PT Client 103 to the WS-PT Web Service 104. The message syntax may be part of a request/response protocol subsection of the WS-PT protocol. Messages using the request/response protocol may contain requests for information, or response to such requests.

The exemplary message syntax depicted in FIG. 4B may be for a notification sent from the notification manager 106 to the WS-PT Client 103. The message syntax may be part of a notification protocol subsection of the WS-PT protocol. Messages using the notification protocol may contain notifications, or information pertaining to subscription requests for notifications.

The Web Service-Process Tracking Protocol (WS-PT) Web Service 104 may be any combination of hardware and software in the provider 101 suitable for handling communications between the provider 101 and the client 102 during the tracking of a distributed business process. For example, the WS-PT Web Service 104 may be a software based web service running on the provider 101, or web service running on specialized hardware connected to the provider 101. The WS-PT Web Service 104 may include components for handling subscription requests from the client 101, such as, for example, a subscription manager 105, and for collecting and sending notifications messages to the client 101, such as, for example, a notification manager 106.

The subscription manager 105 may be a component of the WS-PT Web Service 104 that may process subscription requests from the client 102. A subscription request may be a request by the client 102 to be sent notifications for a specified process. In an alternative embodiment, the subscription manager 105 may be separate from the WS-PT Web Service 104. Any suitable combination of hardware and software may be used to implement the subscription manager 105. For example, the subscription manager 105 may be a software component of WS-PT Web Service 104. The subscription manager 105 may receive subscription requests from the client 101, send confirmation of receipt to the client 101, and instruct the notification manager 106 to send notifications to the client 102 for the process specified in the subscription request.

The notification manager 106 may be a component of the WS-PT Web Service 104 that may collect notifications for processes subscribed to by the client 101 and send the notifications to the client 101. In an alternative embodiment, the notification manager 106 may be separate from the WS-PT Web Service 104. Any suitable combination of hardware and software may be used to implement the notification manager 106. For example, the notification manager 106 may be a software component of WS-PT Web Service 104.

The provider 101 may also include a module for using available processes to perform the distributed business process. An example of this module may be a process engine 107. The process engine 107 may be any combination of hardware and software in the provider 101 suitable for performing a distributed business process. For example, the process engine 107 may be a processor in the provider 101 running specialized business transaction software.

The process engine 107 may utilize processes from among the available processes to perform the distributed business process. Each of the processes may be utilized to complete a task required for the completion of the distributed process, such as, for example, retrieving information from another computer system or performing a calculation. An example of the processes the process engine 107 may utilize may include a Process A 110, a Process B 111, a Process C 112, and a Process D 113. Each of the processes A 110, B 111, C 112 and D 113 may be used by the process engine 107 to perform a different portion of the distributed business process. For example, Process A 110 may be used for communicating with another computer system to check inventory, while Process B 112 may be used for communicating with a computer system containing financial information.

The provider 101 may include a module from which the process engine 107 may retrieve processes, such as the Process A 110, the Process B 111, the Process C 112, and the Process D 113, to be utilized in performing the distributed business process. An example of this module may be a process definition repository 108. The WS-PT Web Service 104 may also use the process definition repository 108 to generate the list of processes available. The process definition repository 108 may be any combination of hardware and software in the provider 101 suitable for storing processes for distributed business processes. The processes may be software components used in distributed business processes. The process definition repository 108 may contain the entirety of a process, or may contain only the definition of the process and a link or pointer to the location of the software for the process, which may be stored on a computer-readable medium connected to the provider 101.

The provider 101 may further include a module which may store log entries generated by the process engine 107 while the process engine 107 is using a process to perform the distributed business process. The module may also store the log entries to be retrieved by the WS-PT Web Service 104. An example of this module may be a process log 109. The process log 109 may be any combination of hardware and software suitable for storing log entries generated by the process engine 107 when performing a distributed business process. When the process engine 107 performs a distributed business process, utilizing processes from the process definition repository 108, log entries may be generated at various points during the performance for each of the processes being utilized. For example, if the process engine 107 is performing a purchase order process, a process for checking inventory kept on another computer system for the item to be purchase may be utilized. Log entries may be generated, for example, when the process for checking inventory starts, when the request for the inventory check has been received and acknowledged by the other computer system, when the result of the inventory check has been returned to the provider 101, and when the process engine 107 processes the result of the inventory check. These log entries may be stored in the process log 109.

Figure 2:
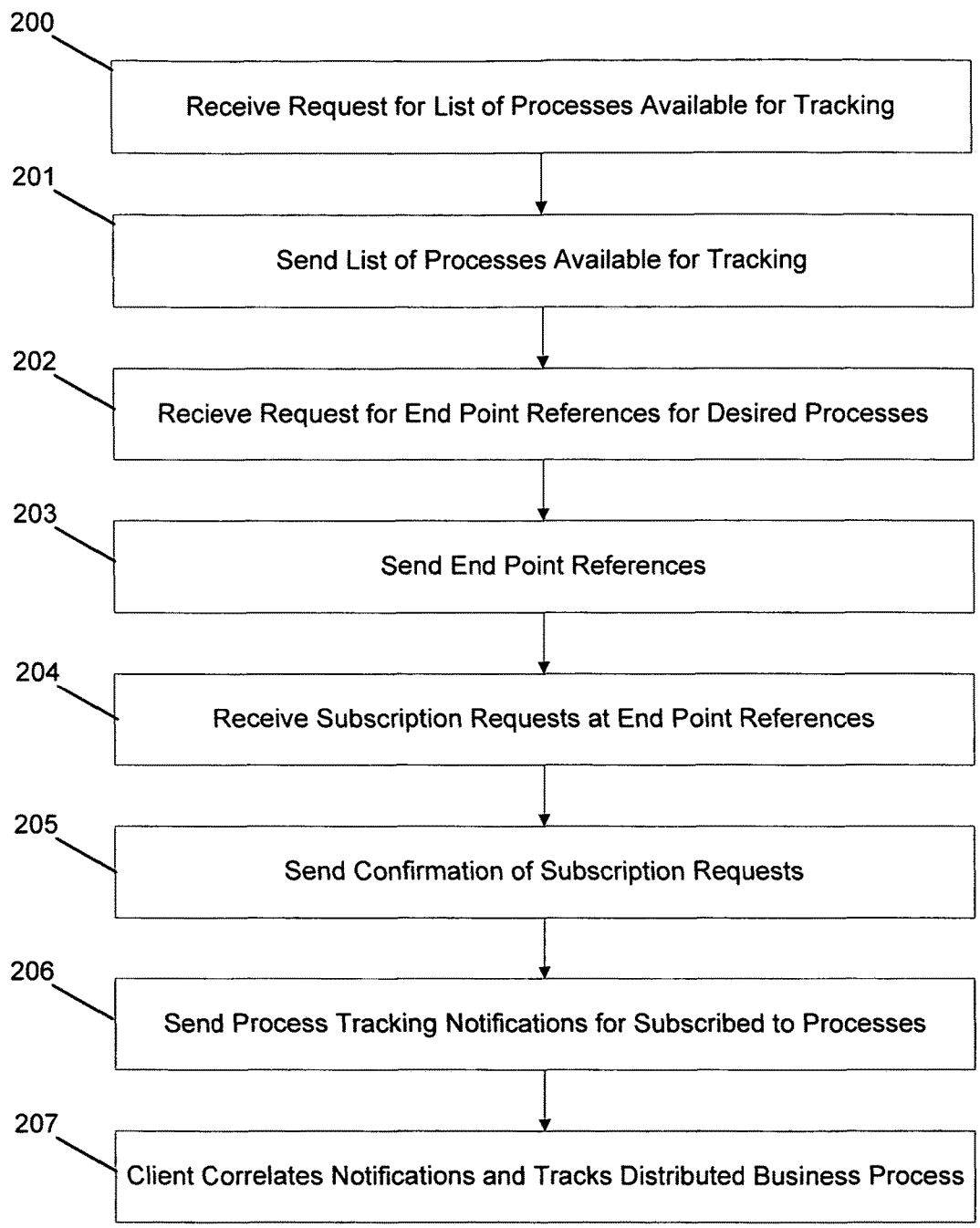
FIG. 2 depicts an exemplary flowchart for distributed business process tracking.
Figure 3:
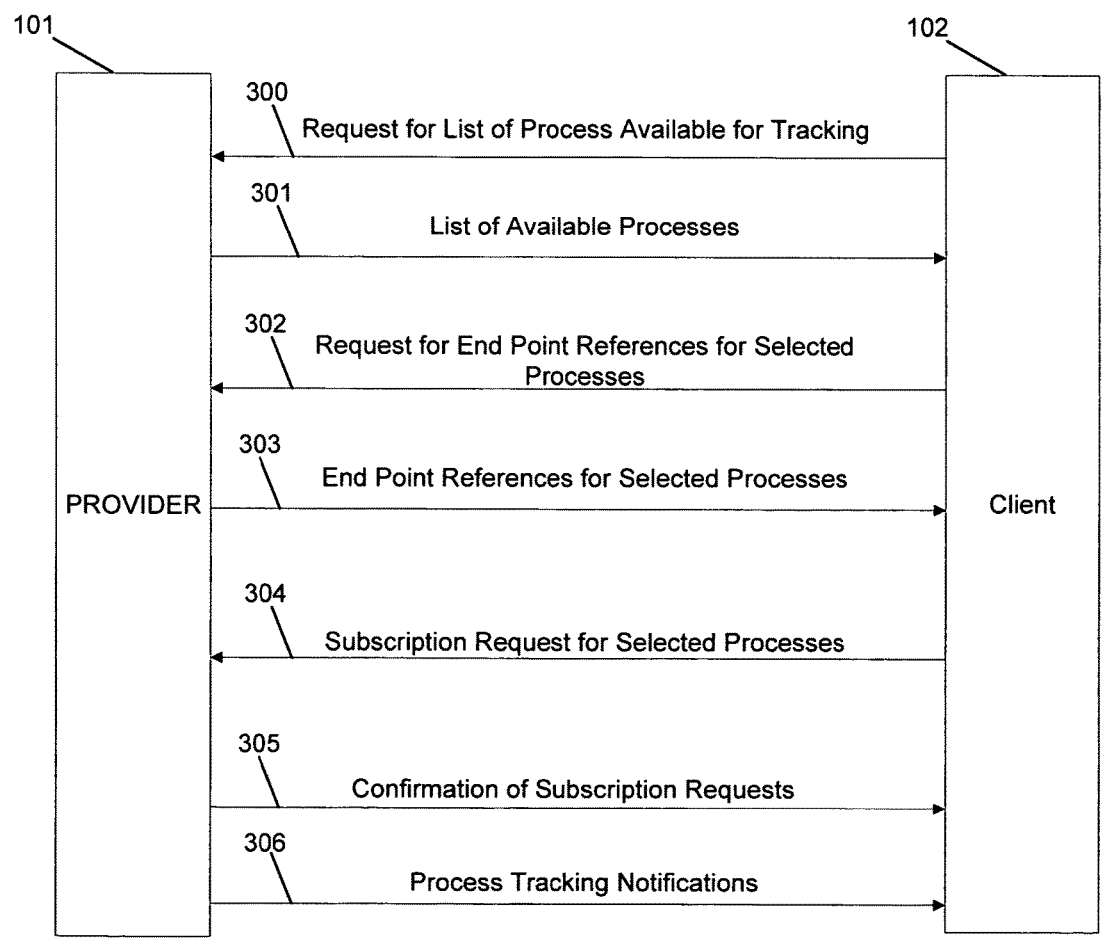
FIG. 3 depicts an exemplary time flow diagram for distributed business process tracking.
Figure 5:
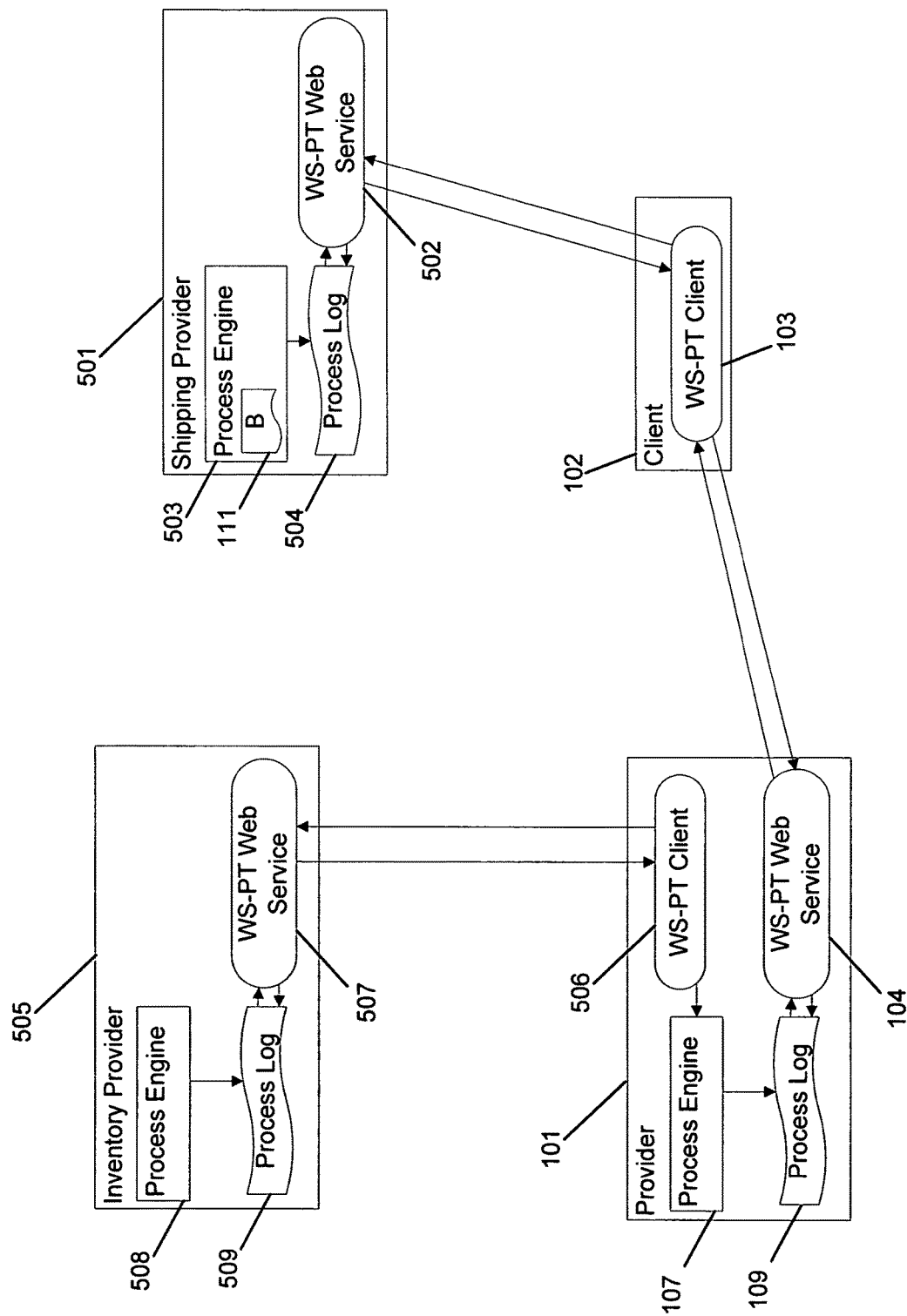
FIG. 5 depicts an exemplary system for distributed business process tracking involving more than one provider.

FIG. 2 depicts an exemplary flowchart for distributed business process tracking. FIG. 3 depicts an exemplary time flow diagram for distributed business process tracking. FIG. 5 depicts an exemplary system for distributed business process tracking involving more than one provider. FIG. 2 and FIG. 3 will be discussed together, with reference to FIG. 1 and FIG. 5.

In block 200, the provider 101 may receive a request for a list of processes available for tracking from the client 102. The WS-PT Client 103 may send the request for the list of processes available to the WS-PT Web Service 104 as message 300, concurrently with the client 102 initiating the distributed business process with the provider 101. The request for the list of processes available may be optional, as the WS-PT Web Service 104 may be configured to automatically send the list of processes available to the WS-PT Client 103 concurrently with the client 102 initiating the distributed business process with the provider 101.

In block 201, the provider 101 may send the list of processes available for tracking to the client 102. The list of processes available may be generated from the process definitions repository 108 by the WS-PT Web Service 104, and may include all processes in the process definitions repository 108 for which notifications may be generated and sent to the client 102. The WS-PT Web Service 104 may send the list of processes to the WS-PT Client 103 on the client 102, as message 301. The list of processes available may be sent to the client 102 automatically after the client 102 has initiated a distributed business process on the provider 101, or the WS-PT Client 103 may submit a request to the WS-PT Web Service 104 for the list of processes available. For example, the client 102 may initiate a purchase order for an item from the provider 101. Upon receiving the purchase order, WS-PT Web Service 104 may automatically send the list of processes available for tracking for the purchase order to the WS-PT Client 103.

For example, if the process definitions repository 108 includes the processes A 110, B 111, C 112, and D 113, all may be included on the list of processes available compiled by the WS-PT Web Service 104. If the distributed business process initiated by the client 101 is known to not make use of, for example, Process A 110, then Process A 110 may be left off of the list of processes available compiled by the WS-PT Web Service 104.

Blocks 200 and 201 may be repeated when a refresh of the list of processes available is needed by the client 102. For example, the client 102 may request the list of processes available again after a period of time has passed during which a change in the list of processes available is expected to have taken place. Additionally, the list of processes available may be different for different clients 102, based on the identity of the client 102 and the visibility permissions the client is granted based on the credentials of the client 102.

In block 202, the client 102 may send a request to track to the provider 101 for end point references for the processes that the client 102 wishes. The client 102 may select the processes for which the client 102 wishes to receive notifications from the list of processes available received in block 201. The selection of these desired processes may be done, by, for example, the WS-PT Client 103, or any suitable component of the client 102. Alternatively, the desired processes may be selected by, for example, a user. For example, if the list of processes available includes Process B 111, Process C 112, and Process D 113, the client 102 may desire to track only Process C 112 and Process D 113. The WS-PT Client 103 may send a request for the end point references for Process C 112 and Process D 113 to the WS-PT Web Service 104.

Block 202 may be repeated by the client 102 periodically, as needed during the tracking of the distributed business process. For example, if the client 102 receives a refreshed list of processes available from the provider 101, the client 101 may send another request for end point references to the provider 101 based on the refreshed list of processes available.

In block 203, the client 102 may receive the end point references requested in block 202 from the provider 101. The WS-PT Web Service 104 may receive the message 302 requesting the end point references for the desired processes from the WS-PT Client 103. Based on the desired processes in the request for end point references in the message 302, the WS-PT Web Service 104 may send the requested end point references to the WS-PT Client 103 as message 303. The WS-PT Client 103 may receive the end point references.

For example, if the WS-PT Web Service 104 has received a request for the end point references for the Process C 112 and the Process D 113, the WS-PT Web Service 104 may send the end point references for the Process C 112 and the Process D 113 to the WS-PT Client 103.

In block 204, the client 102 may send subscription requests to the end point references received in block 203. The end point reference for a process may designate an address, such as the address of the subscription manager 105, to which the WS-PT Client 103 may send message 304, requesting a subscription to notifications for the process. If the subscription manager 105 is a component of the WS-PT Web Service 104, the WS-PT Client 103 may address the subscription request to the proper end point reference, but send the subscription request to the WS-PT Web Service 104. The WS-PT Web Service 104 may route the subscription request to the subscription manager 105 based on the end point reference to which the WS-PT Client 103 addresses the subscription request. The subscription requests may also include an update interval, indicating how often the client 102 wishes to receive notifications from the provider 101. For example, an update interval of 5 minutes may indicate that the provider should only send notifications to the client 102 once every 5 minutes, sending all of the notifications that have been generated during each 5 minute period.

For example, if the client 102 has received the end point references for the Process C 112 and the Process D 113, the WS-PT Client 103 may send subscription requests to the end point references. If the end point references point to the subscription manager 105, the subscription requests from the WS-PT Client 103 may be delivered to the subscription manager 105.

In another embodiment, blocks 202 and 203 may be skipped, and the client 101 may send a subscription request directly to the WS-PT Web Service 104, without using end point reference. The WS-PT Web Service 104 may route the subscription requests to the appropriate end point references, for example, the subscription manager 105.

In block 205, the provider 101 may send the client 102 confirmation that the subscription requests sent in block 204 have been received and that the client 102 is now subscribed to notifications for the processes specified in the subscription requests. For example, the subscription manager 105 may send the confirmation of subscriptions requests as message 305 to the WS-PT Client 103. The subscription manager 105 may setup the requested subscriptions on the notification manager 106. Upon receiving the confirmation of the subscription requests from the subscription manager 105, the WS-PT Client 103 may prepare receive notifications from the processes to which the client 102 has subscribed. The confirmation of the subscription requests may include, for example, an address for the notification manager 106, allowing the WS-PT Client 103 to determine if any received notifications have come from the correct source.

For example, if the client 102 sends subscription requests for the Process C 112 and the Process D 113, the subscription manager 105 may send confirmation to the WS-PT client 103 that the client 102 will receive notifications for the Process C 112 and the Process D 113.

In block 206, the provider 101 may send the notifications for the processes to which the client 102 has subscribed to the client 102. For example, the provider 101 may perform the distributed business transaction initiated by the client 102. The process engine 107 may use processes from the process definition repository 108 to perform the distributed business transaction. As the process engine 107 runs a process, the process engine 107 may write log entries to the process log 109. The log entries may include information on the status of the process at a particular time, such as, for example, the results of an operation attempted by the process, and may be generated based on events or at periodic intervals. Other information included in a log entry may include, for example, the names and/or addresses of remote computer systems with which the provider 101 communicated, any error messages generated by the process engine 107, etc. The WS-PT Web Service 104 may access and collect any log entries in the process log 109. The log entries may be checked to determine which log entries were generated by processes to which the client 102 has subscribed. The notification manager 106 may send the log entries, as notifications, for processes to which the client 102 has subscribed to the WS-PT client 103, in message 306. The timing of the sending of the notifications may be based on the update interval set by the client 102. The notifications may be sent individually, as a separate message, or multiple notifications may be packaged together and sent as a single message. For example, see related application, U.S. patent application Ser. No. 12/073,647, entitled "System and Method for Bulk Even Transfer".

For example, if the process engine 107 is using the Process C 112 to communicate with another computer system to check inventory, a log entry may be written to the process log 109 when the Process C 112 begins, when a message has been sent to the other computer system, when a reply has been received from the other computer system, and when the Process C 112 ends. The log entries written to the process log 109 during the first 5 minutes of the process engine 107 running the Process C 112 may include, for example, the process has begun, and, a message has been sent to the remote computer system. The WS-PT Web Service 104 may monitor the process log 109 and collect the log entries generated for the Process C 112. If the client 102 has subscribed to the Process C 112, and set an update interval of 5 minutes, the notification manager 109 may send all the log entries in the process log 109 for the Process C 112 as notifications to the WS-PT Client 103 5 minutes after the subscription manager 105 received the subscription request from the WS-PT Client 103. The update interval may also be measured from any other suitable starting point.

The client 102 may receive notifications from any provider 101 involved in the performance of the distributed business process to which the client 102 has sent a subscription request. For example, referring to FIG. 5, the client 102 may submit subscriptions requests to both the provider 101 and a shipping provider 501. The shipping provider 501 may be similar to the provider 101, including a WS-PT Web Service 502, a process engine 503, and a process log 504, along with any other modules that may be included in the provider 101. The shipping provider 501 may be used in the distributed business process to arrange for the shipping of an item. The client 102 may receive notifications from both the provider 101 and the shipping provider 501.

The provider 101 may also act similarly to the client 102 with respect to another provider 101. For example, referring to FIG. 5, the distributed business process may require the process engine 107 to utilize the Process C 112 to check inventory on another computer system, an inventory provider 505. The inventory provider 505 may be similar to the provider 101, including a WS-PT Web Service 507, a process engine 508, and a process log 509. The inventory provider 505 may be used in the distributed business process to determine if an item is in inventory at a warehouse. The provider 101 may include WS-PT Client 506, which may interact with the WS-PT Web Service 507 in the same manner as the WS-PT Client 103 interacts with the WS-PT Web Service 104. The provider 101 may receive notifications from the inventory provider 505. The notifications received by the provider 101 may in turn be sent to the client 102, or may be used by the process engine 107 to write log entries that will be used in the notifications sent to the client 102.

In block 207, the client 102 may correlate the notifications received in block 206 with the distributed business process, thereby tracking the distributed business process. For example, the notifications received by the WS-PT Client 103 from the notification manager 106 may include information concerning the status of the processes used to perform the distributed business transaction. The client 102 may determine to which process a received notification belongs, and update the status of the process based on the informational content included in the notification. The updated status of each process may be used to determine the status of the portions of the distributed business process, and the overall progress of the distributed business process. The progress of the distributed business process may be for example, displayed to a user of client 102, stored on a computer readable medium, for example, as a log, or sent from the client 102 to another computer system or remote display device, etc.

For example, the WS-PT Client 103 may receive the notifications from the notification manager 106 five minutes after the subscription manager 105 received the subscription requests. The notifications may include two notifications for Process C 112 for checking inventory on another computer system, indicating that the process has begun, and that a message has been sent to the remote computer system. The client 102 may determine that these notifications belong to Process C 112, and update the status of Process C 112 to reflect the informational content in the notifications. The overall progress of the distributed business process initiated by the client 102 may be updated with the updated status of the Process C 112. The progress of the distributed business process may, for example, be displayed to a user through messages stating "Inventory Checking Process Started" and "Inventory Checking Request Sent to Remote System at IP 192.168.4.1."

The client 102 may receive notifications from more than one provider 101 that correlate to the same portions of the distributed business process. For example, referring to FIG. 5, one portion of the distributed business process may requires two different inputs, one of which may be obtained from the Process A 110 on the provider 101 and the other of which may be obtained from the Process B 111 on the shipping provider 501. The client 102 may receive notifications for the Process A 110 from the provider 101 and notifications for the Process B 111 from the shipping provider 101. The notifications for both the Process A 110 and the Process B 111 may be correlated to the same portion of the distributed business process, and the progress of the overall business process may be updated accordingly.

The notifications may be sent to the client 102 as long as the distributed business process is ongoing. Whether the distributed business process has finished may be determined by the client 102 based on the progress of the distributed business process as determined through the received notifications. For example, if the client 102 has received notifications indicating that all processes that must successfully complete to complete the distributed business process have been successfully completed, the client 102 may determine that the distributed business process is finished. The processes may be spread across more than one provider 101, and the successful completion of all processes on a single provider 101 may not indicate that the distributed business process has finished if the distributed business process requires completion of a process on another provider 101. The client 102 may stop receiving notifications from the provider 101 on which all processes have successfully completed.

For example, the distributed business process initiated by the client 102 may be finished when both the Process C 112 and the Process D 113 have successfully completed, or at least one of the two has failed. The client may check received notifications to determine if the Process C 112 and the Process D 113 have either successfully completed or failed. If the notifications indicate successful completion of both the Process C 112 and the Process D 113, or that one of the two has failed, the client 102 may determine that the distributed business process has finished.

Figure 6:
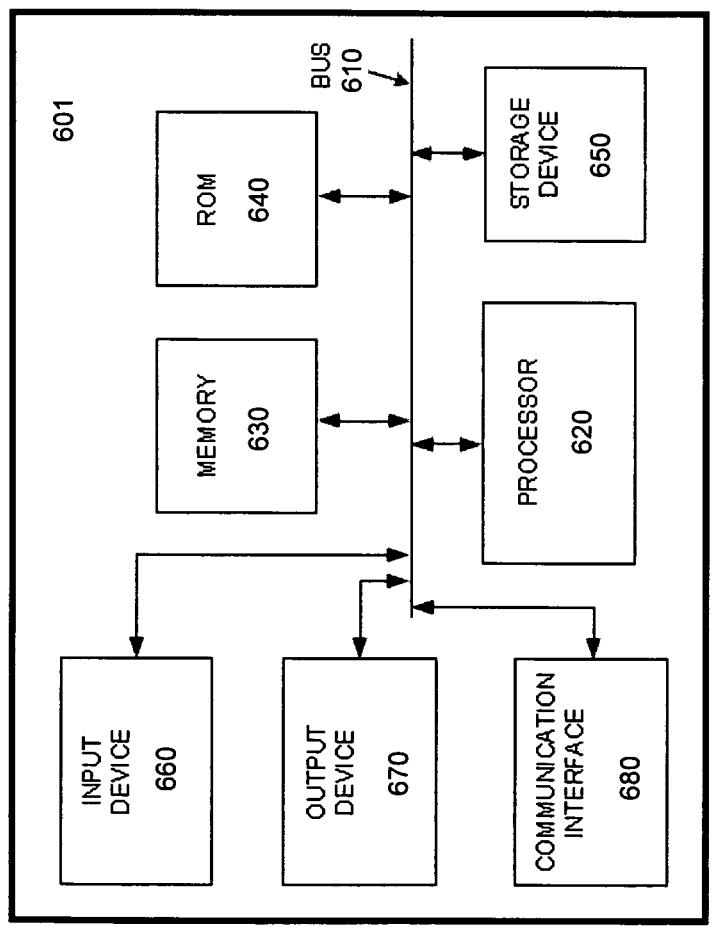
FIG. 6 depicts an exemplary architecture for implementing a computing device.

FIG. 6 illustrates an exemplary architecture for implementing a computing device 601, which may be used to implement any of the provider 101, the client 102, or any other computer system or computing device component thereof. It will be appreciated that other devices that can be used with the computing device 601, such as a client or a server, may be similarly configured. As illustrated in FIG. 6, computing device 601 may include a bus 610, a processor 620, a memory 630, a read only memory (ROM) 640, a storage device 650, an input device 660, an output device 670, and a communication interface 680.

Bus 610 may include one or more interconnects that permit communication among the components of computing device 601. Processor 620 may include any type of processor, microprocessor, or processing logic that may interpret and execute instructions (e.g., a field programmable gate array (FPGA)). Processor 620 may include a single device (e.g., a single core) and/or a group of devices (e.g., multi-core). Memory 630 may include a random access memory (RAM) or another type of dynamic storage device that may store information and instructions for execution by processor 620. Memory 630 may also be used to store temporary variables or other intermediate information during execution of instructions by processor 620.

ROM 640 may include a ROM device and/or another type of static storage device that may store static information and instructions for processor 620. Storage device 650 may include a magnetic disk and/or optical disk and its corresponding drive for storing information and/or instructions. Storage device 650 may include a single storage device or multiple storage devices, such as multiple storage devices operating in parallel. Moreover, storage device 650 may reside locally on the computing device 601 and/or may be remote with respect to a server and connected thereto via network and/or another type of connection, such as a dedicated link or channel.

Input device 660 may include any mechanism or combination of mechanisms that permit an operator to input information to computing device 601, such as a keyboard, a mouse, a touch sensitive display device, a microphone, a pen-based pointing device, and/or a biometric input device, such as a voice recognition device and/or a finger print scanning device. Output device 670 may include any mechanism or combination of mechanisms that outputs information to the operator, including a display, a printer, a speaker, etc.

Communication interface 680 may include any transceiver-like mechanism that enables computing device 601 to communicate with other devices and/or systems, such as a client, a server, a license manager, a vendor, etc. For example, communication interface 680 may include one or more interfaces, such as a first interface coupled to a network and/or a second interface coupled to a license manager. Alternatively, communication interface 680 may include other mechanisms (e.g., a wireless interface) for communicating via a network, such as a wireless network. In one implementation, communication interface 680 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 601 may perform certain functions in response to processor 620 executing software instructions contained in a computer-readable medium, such as memory 630. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A non-transitory computer-readable medium storing instructions, which when executed by a computer system, cause the computer system to perform operations comprising:

receiving, at a first Web Service (WS) engine running on a processor and from a client computer system via a Web Service-Process Tracking (WS-PT) web service, a request to initiate a distributed WS transaction to be performed by the first WS engine and at least one additional WS engine, the at least one additional WS engine running on at least one remote processor;

determining, at the first WS engine, first WS processes that are used for the distributed WS transaction by the first WS engine;

receiving, from the at least one additional WS engine, remote WS processes that are used by the at least one additional WS engine for the distributed WS transaction;

in accordance with receiving the request to initiate the distributed WS transaction, automatically sending, from the first WS engine and to the client computer system via the WS-PT web service, a list comprising a subset of the first WS processes and the remote WS processes which are available for tracking;

receiving, at the first WS engine from the client computer system via the WS-PT web service, a selected process from the list, wherein the selected process is one of the remote WS processes, and wherein the selected process is selected due to a failure of the distributed WS transaction;

in response to reception of the selected process from the client computer system, sending, back to the client computer system and from the first WS engine via the WS-PT web service, an end point reference for direct communication regarding a status of the selected process within the distributed WS transaction, the end point reference comprising one of an address and a redirect address;

receiving, at the first WS engine from the client computer system via the WS-PT web service, a subscription request for the selected process at the end point reference, the subscription request identifying an update interval for periodic updates regarding the status of the selected process;

sending, from the first WS engine to the client computer system via the WS-PT web service, a confirmation of receipt of the subscription request for the selected process;

while the distributed WS transaction is being performed, receiving, at the first WS engine, log information collected in connection with processes performed for the distributed WS transaction, the log information stored into a process log, the log information including (a) entries for the first WS processes performed by the first WS engine and (b) entries for the remote WS processes performed by the at least one additional WS engine;

selectively generating, at the first WS engine for each update interval, notifications from the process log based on which process was selected, the process log including a status of the selected process; and sending, from the first WS engine to the client computer system via the WS-PT web service for each update interval, the selectively generated notifications, wherein the client computer system is configured to:
receive the notifications from the first WS engine and the at least one additional WS engine regarding the first WS processes and the remote WS processes, automatically correlate the received notifications to the distributed WS transaction to determine a progress of the distributed WS transaction that was initiated in response to the request, and automatically identify, from the automatic correlation, which WS processes, among the first WS processes and the remote WS processes, are involved in the distributed WS transaction and, as needed, which WS process have caused a failure of the distributed WS transaction.

2. The non-transitory computer-readable medium of claim 1, having additional instructions stored which, when executed by the computer system, cause the computer system to perform operations comprising:
collecting the status from the process log; and
generating the notification based on the status.

3. The non-transitory computer-readable medium of claim 1, having additional instructions stored which, when executed by the computer system, cause the computer system to perform operations comprising:
generating the list using a process definitions repository.

4. The non-transitory computer-readable medium of claim 1, wherein receiving the subscription request and sending the confirmation are performed by a subscription manager component of the first WS engine.

5. The non-transitory computer-readable medium of claim 1, wherein sending the process log is performed by a notification manager component of the first WS engine.

6. The non-transitory computer-readable medium of claim 1, wherein sending and receiving uses a platform independent protocol.

7. The non-transitory computer-readable medium of claim 1, wherein the WS-PT web service uses a Simple Object Access Protocol based protocol.

8. A non-transitory computer-readable medium comprising instructions, which when executed by a computer system, causes the computer system to perform operations comprising:
in response to a request to initiate a distributed web service (WS) transaction, automatically receiving, at a client computer system from a first processor via a Web Service-Process Tracking (WS-PT) web service, a list comprising a plurality of processes available for tracking, the plurality of processes to be performed at a first processor and at least one secondary processor remotely located from the first processor;

selecting a process from the list, to obtain a selected process, wherein the selected process is a part of a distributed software process to be performed at least in part by the at least one secondary processor, the process being selected due to a failure to receive a notification of a progress of the selected process;

sending, to the first processor from the client computer system via the WS-PT web service, the selected process;

in response to sending the selected process to the first processor, receiving, at the client computer system from the first processor via the WS-PT web service, an address for direct communication regarding the progress of the selected process;

sending, to the first processor from the client computer system via the WS-PT web service, a subscription request for the selected process;

receiving, at the client computer system from the first processor, a confirmation of receipt of the subscription request;

sending, at periodic intervals, a query from the client computer system to the first processor, the query requesting the progress of the selected process executed by the at least one secondary processor, wherein the first processor is configured to maintain log information including (a) entries for a first WS processes performed on the first processor, and (b) entries for a second WS processes performed on the at least one secondary processor;

periodically receiving, in response to the query, the progress of the selected process based on the entries including in the log information maintained by the first processor;

creating a process log based on the progress of the selected process, wherein the process log is automatically updated with each periodic response;

automatically correlating process log information in the created process log to (1) determine progress of the distributed software process towards completion, and (2) determine, as needed, which WS processes, among the first WS processes performed on the first processor and the second WS processes performed on the at least one secondary processor, have caused a failure of the distributed software process.

9. The non-transitory computer-readable medium of claim 8, wherein sending and receiving uses a platform independent protocol.

10. The non-transitory computer-readable medium of claim 8, having additional instructions stored which, when executed by the computer system, cause the computer system to perform operations comprising:
correlating the progress of the selected process with the process log by:
extracting an informational content of the response; and
updating the process log based on the informational content.

11. The non-transitory computer-readable medium of claim 8, wherein the WS-PT web service uses a Simple Object Access Protocol based protocol.

12. A system comprising:
a first processor; and
a non-transitory computer-readable storage medium having instructions stored which, when executed by the first processor, cause the first processor to perform operations comprising:
receiving, at the first processor from a client computer system via a Web Service-Process Tracking (WS-PT) web service, a request to initiate a distributed software process to be performed by the first processor and at least one remote processor;

determining, at the first processor, first processes that are used for the distributed software process by the first processor;

receiving, from the at least one remote processor, remote processes that are used by the at least one remote processor for the distributed software process;

in accordance with receiving the request to initiate the distributed software process, automatically sending, from the first processor to the client computer system via the WS-PT web service from the first processor, a list comprising a subset of the first processes and the remote processes which are available for tracking;

receiving, at the first processor from the client computer system via the WS-PT web service, a selected process from the list, wherein the selected process is one of the remote processes, and wherein the selected process is selected due to a failure to receive a notification regarding a status of the selected process;

in response to reception of the selected process from the client computer system, sending back to the client computer system, from the first processor via the WS-PT web service, an address for direct communication regarding progress of the selected process;

receiving, at the first processor from the client computer system via the WS-PT web service, a subscription request for the selected process at the address, the subscription request identifying an update interval for periodic updates regarding the status of the selected process;

sending, from the first processor to the client computer system via the WS-PT web service, a confirmation of receipt of the subscription request for the selected process;

while the distributed software process, receiving, at the first processor, log information collected in connection with performance of the distributed software process, the log information stored into a process log, the log information including (a) entries for at least one process performed by the first processor and (b) entries for at least one process performed by the at least one remote processor;

selectively generating, at the first processor for each update interval, notifications from the process log based on which process was selected, the process log including a status of the selected process and identifying information of a remote processor executing the selected process; and sending, from the first processor to the client computer system via the WS-PT web service via the address for each update interval, the selectively generated notifications, wherein the client computer system is configured to:
   receive the notifications from a plurality of providers at end point references of a second plurality of processes, wherein the distributed software process comprises the second plurality of processes, and
   automatically correlate the received notifications to the distributed software process to determine a progress of the distributed software process that was initiated in response to the request, wherein as part of the automatic correlation at least one process among the first processes and the remote processes is identified, based on the received notifications, as being involved in the distributed software process and has caused a failure of the distributed software process failing.

13. The system of claim 12, wherein the first processor is further adapted to generate the process log based on using the selected process to perform the distributed software process.

14. The system of claim 12, wherein the WS-PT web service operates using a platform independent protocol.

15. The non-transitory computer-readable medium of claim 1, wherein the selected process is performed by the at least one remote processor, and the first processor relays the status of the at least one remote processor in completing the selected process to the client in accordance with the periodic updates.

\* \* \* \* \*